United States Patent
Quichaud et al.

[11] Patent Number: 5,665,395
[45] Date of Patent: Sep. 9, 1997

[54] DEVICE FOR INJECTION MOLDING OF SLURRIES

[75] Inventors: Claude Quichaud, Ville D'Avray; Pierre Guy Peytavin, Neuilly-sur-Seine; Francois David, Ifs, all of France

[73] Assignee: Impac Technologies, Boulogne-Billancourt, France

[21] Appl. No.: 487,389

[22] Filed: Jun. 7, 1995

Related U.S. Application Data

[62] Division of Ser. No. 241,586, May 12, 1994.

[30] Foreign Application Priority Data

May 24, 1993 [FR] France .................. 93 06129

[51] Int. Cl.⁶ ........................................ B29C 45/00
[52] U.S. Cl. .................. 425/73; 264/28; 419/10; 419/40; 425/546

[58] Field of Search .................. 264/28, 63, 60; 419/10, 38, 40; 425/546, 73

[56] References Cited

U.S. PATENT DOCUMENTS

| | | | |
|---|---|---|---|
| 4,965,027 | 10/1990 | Takahashi | 264/28 |
| 5,047,181 | 9/1991 | Occhionero et al. | 264/28 |

*Primary Examiner*—Tim Heitbrink
*Attorney, Agent, or Firm*—Oblon, Spivak, McClelland, Maier & Neustadt, P.C.

[57] ABSTRACT

A device for the production of a green from slurry by solidification after injection into a mold having a temperature of less than 0° C. The device includes a mold having a jack wherein moveable parts of the jack ensure closure thereof and which are housed within a gas-tight vessel. A distributor for dry gas with a dew point lower then the temperature of the mold emits a gas current into the vessel through apertures. A chute conducts the green towards an exit aperture and to a receiving member outside the vessel.

16 Claims, 7 Drawing Sheets

DEVICE FOR INJECTION MOLDING OF SLURRIES

This is a divisional application of U.S. Application Ser. No. 08/241,586 filed May 12, 1994, now pending.

BACKGROUND OF THE INVENTION

1. Field of the Invention

The process and the device according to the invention relate very generally to the mass production of greens from a slurry comprising a divided solid phase, containing at least one metallic or ceramic powder placed in suspension in an aqueous or non-aqueous liquid phase.

The process consists of injecting the slurry into a mold cooled to a temperature lower than the solidification temperature of the slurry, then after solidification of the green thus obtained, of ejecting said green from the mold. Said green is then vacuum dried and then sintered at a temperature according to its composition in order to obtain the finished part.

2. Discussion of the Background

Various operations have shown that this process enables parts with a high density and very good characteristics (physical, mechanical, magnetic, electrical and so on) to be obtained after sintering.

Published patent applications WO 88/07902 and WO 88/07903 describe in a very detailed manner and by way of example the requirements for production of slurries containing metallic or non-metallic powders.

The first of these applications concerns the use, as a liquid phase, of water with different added compounds acting as cryoprotectors and as dispersants, and the second application uses non-aqueous compounds as a liquid phase.

The examples given in these two documents show that, with the exception of the case in which the suspension of the powder, or mixture of powders, is done in an organic liquid at a raised solidification temperature, molding of the slurry is carried out in a mold brought to a temperature significantly lower than 0° C., so that the temperature difference between the mold and the solidification temperature of the slurry is sufficiently great to obtain very rapid solidification of the green with reduced risk of heterogenisation of the solid-liquid mixture.

In the examples given in application WO 88/07902, a mold temperature of −78° C. is used.

This working method enables very solid greens to be obtained which are easy to handle, which are subsequently dried by vacuum sublimation without risk of fissuring or deformation. During sintering very high actual densities of the order of 99% or more of the theoretical density can be achieved, something not known to be achievable using conventional methods of compression and sintering of powders, or by classical injection molding processes using thermoplastic binders.

Cooling of the molds is done in a known manner, for example by circulation of a coolant fluid cooled by known means.

It has been noted that even when the opening time of a mold cooled in this manner is reduced to a minimum for extracting the solidified green, ice deposits form on the joint planes of the mold as well as on the walls. These deposits prevent normal functioning of the joint planes, increase with each cycle of production of a green, and the thickness rapidly becomes too great for operations to be carried out. These deposits rapidly bring the functioning of the machine to a halt.

In order to remedy this inconvenience, it was proposed to house the entire installation inside a large gas-tight vessel, in which the dew point of the air or the gas contained would be lowered to below the temperature of the mold.

Such a vessel is difficult to produce as it has to contain not only the mold but also the means for opening and closing it, the means for injecting the slurry into the mold and also the means for ejecting and for then receiving and transferring the green to the outside of the vessel.

As indicated above, it is necessary to have a mold temperature as low as possible to obtain quality greens, that is to say in practice reaching a level equal to or below −20° C. and preferably approximately in a range of between −20° C. and −100° C. Understandably it is extremely difficult to produce a large vessel, in which the gas contained has a dew point lower than the temperature of a mold within the indicated range. It is above all very difficult to conceive of a vessel of this type in which the dew point of the gas contained is maintained at such a value during mass production, in a rapid cycle, of greens injected in this manner.

The possibility of avoiding ice formation on the wall of the mold has been researched, particularly at each opening thereof, without having to use large gas-tight vessels, and without using complicated devices for holding the greens and transferring them to the outside.

More particularly attempts have been made to perfect a process and device for enabling very high production rates to be achieved with cycle lengths sufficiently short to be able to produce about 2 greens or more per minute.

Attempts have also been made to perfect a process and device which allows easy changing of the molds and also a device all the parts of which are easy to clean and maintain in service.

SUMMARY OF THE INVENTION

The process and the device which form the subject-matter of the invention enable these results to be obtained.

The invention relates to a process for producing greens from a slurry, for production, by drying and sintering, of sintered parts. According to the process, a slurry comprising a solid phase containing at least one metallic or non-metallic powder in suspension in a liquid phase is injected into a mold brought to a temperature lower than 0° C. and lower than the solidification temperature of said liquid phase, then after solidification of the green, it is ejected from the mold.

In the present invention, powders is understood to be all powders, whatever means they are obtained by, or whatever their geometry, particularly with respect to dimensions, ranging from nanometric dimensions to millimeters, and also metallic or non-metallic fibers not exceeding 5 mm in length.

In accordance with the invention, in the interior of a vessel with gas-tight walls there are housed at least the fixed and moveable parts of the mold as well as the moveable parts of at least one means which effects closure of the mold, its retention in the closed position and then its opening, as well as the means for ejection, for receiving the ejected green and means for transferring said green in the direction of an outlet aperture of the vessel, and inside said vessel a current of gas is produced which circulates preferable in the proximity of the walls of the mold, this current being created by the distribution of a dry gas stream with a dew point lower than the temperature of the mold, at least one outlet aperture being provided in the wall of the vessel, this aperture being open in a continuous or discontinuous manner.

The gas current is preferably produced by emission inside the vessel in the proximity of the mold.

The current of gas is preferably created by means of a distributor which allows the dry gas stream to be distributed along the walls of the mold by virtue of one or more suitably oriented apertures. Preferably, a tube closed at one end is used, for example, and connected at the other end to the dry gas supply, this tube being preferably folded into a ring or trapezoid and provided with apertures distributed along a generatrix in the direction of the mold.

The gas stream is preferably oriented in the direction of the mold.

The dry gas stream distributed in this manner can be air, nitrogen, argon or any other gas or mixture of gases having physic-chemical properties which are compatible with the slurry.

The outlet aperture is preferably provided in the wall of the vessel at a point situated beyond the mold with respect to the distribution area of the dry gas stream.

The outlet aperture can be located on the lower part of the vessel at the lower end of a chute along which the green ejected from the mold descends and then passes through said permanently open aperture.

In an advantageous manner a mobile receiving tray is used, provided with means for damping the impact of the green, such as a deformable receiving surface for damping the fall of the green, then said green is transferred to an outlet point which is equipped in a manner so as to limit the risk of penetration of humidity contained in the external air into the interior of the vessel.

Optionally, in order to better dampen the impact of the green on the receiving means, said receiving means can be provided with a lifting means which reduces the length of the fall of the green.

In an advantageous manner, the deformable receiving surface is permeable and a dry gas stream is introduced into the interior of this tray which passes through said surface from bottom to top, inflating it. The rate of dry gas discharge through said receiving surface is adjusted so that it does not disturb the main gas current coming from the distributor.

When the flow of gas contained in the vessel through the outlet aperture for the greens is discontinuous during the opening of the outlet aperture and proves to be insufficient, a supplementary aperture is advantageously provided, with a manual or automatic control valve which allows the rate of discharge of gas from the vessel to be precisely adjusted.

The pressurization existing in the vessel is preferably controlled in an automatic manner by adjusting the incoming rates of the dry gas stream and of discharge of the gas from the vessel in order to maintain a set pressurization while producing a current of dry gas around the mold, guaranteeing a dew point lower than the temperature of said mold in the region thereof.

The means ensuring the closure of the mold, its retention in the closed position and its opening can be, for example, a jack or knuckle joint.

The invention also relates to a device which allows the process according to the invention to be carried out. This device is applicable to all molding machines, generally known as injection presses, able to inject the slurry used in the invention and in particular in a manner which is not in any way limiting, can also be used just as well for machines for molding slurries where the two parts of the mold comprise a vertical closure plane and which are therefore closed or opened by displacement of one of these parts according to a horizontal axis as for machines where the two parts of the mold have a horizontal closure plane, the axis of opening or closing being vertical. The axis of injection of the slurry is most often, but not necessarily, parallel to the axis of opening/closing of the mold, injection being carried out through a fixed plate carrying the fixed part of the mold. Nevertheless, it is also possible to carry out injection in the plane of closure of the mold.

This device can be adapted more generally to all injection presses in which it is necessary to keep the mold at a temperature lower than 0° C.

According to the invention, the fixed and moveable parts of the mold as well as the moveable parts of at least one jack are housed in the interior of a gas-tight vessel.

Preferably one face of this gas-tight vessel is integral with the fixed tray on which one part of the mold is mounted and an aperture is provided in the wall of the vessel, in the fixed plate and in the fixed part of the mold allows injection of the slurry by means of an injection means such as an injector located outside the vessel. Such a device allows easy cleaning or any servicing of the injection means if necessary during operation without necessitating opening of the vessel and without disturbing the dry atmosphere in the proximity of the mold.

At the end of each injection of slurry the injector is preferably withdrawn to prevent its end cooling to a low temperature.

The two parts of the mold are cooled by the circulation of a coolant fluid cooled to a very low temperature or by reduction of pressure of a liquified gas. The refrigerant unit is arranged outside the vessel and connected to the two parts of the mold by thermally insulated channels. The temperature of the mold is preferably adjusted to between 0° C. and −100°, preferably to between −20° C. and −100° C. The slurry injection pressure is adjusted according to the degree of viscosity of the slurry and the degree of complexity of the shape of the greens to be produced.

Opening and closing of the mold is done in a known manner by an opening and closing means such as, for example, a dual operation hydraulic jack, the fixed plate being made integral with the jack by retaining rods along which the moveable plate slides. The opening and closing means can also be, for example, a knuckle joint.

The slurry used is produced in a known manner, as described in several documents such as the two WO documents previously cited. The injection methods are also well known to the man skilled in the art.

A dry gas atmosphere with a dew point lower than the temperature of the mold is produced in the vessel preferably in the proximity of the walls of the mold. This atmosphere is created by at least one means for distribution of gaseous fluid with a dew point lower than the working temperature of the mold, this distribution means being located inside the vessel. Such a means for distribution of the dry gas stream, hereafter referred to as a distributor, is preferably located in the proximity of the mold. In a machine with a horizontal axis of closure, this distributor is preferably located between the upper part of the mold and the upper wall of the vessel. It can be a tube perforated with holes spaced more or less along a generatrix and oriented in a manner such as to emit the dry gas towards the mold.

The tube is advantageously arranged in a ring or trapezoid for the better distribution of the dry gas. An annular distributor can also be used, comprising two concentric lips between which there is a thin annular slot. The dry gas stream supply is arranged outside the vessel and connected to the distributor by a pipe passing through the wall of the vessel. The means for producing dry air with a dew point lower than 0°, −40°, −60° or even −100° C., or any other temperature in between these values, are well known to the man skilled in the art.

In the same way, instead of air another gas such as nitrogen, argon or any other gas or mixture of gases, the dew point of which is lower than the temperature of the mold, can be used.

If a sufficient discharge rate of dry gas is produced, it is possible to provide, for example, on the lower extremity of the vessel in the case of a molding machine with a horizontal axis of opening, a permanently open aperture to which a chute is connected and arranged so that it receives the greens ejected after opening of the mold.

The ejection means for such molded greens are well known to the man skilled in the art and are most often fingers pushed, for example, by small jacks which are engaged in the wall of the mold pressing against the injected green and, after opening of the mold, exerting the pushing action required to cause ejection. The chute then guides the ejected green, which passes through the aperture of the vessel.

Test have shown that in the case of small, relatively rigid greens, it is possible to extract greens in this manner without the introduction of faults therein.

Provided that a sufficient rate of dry gas discharge is maintained, under the conditions described above for extraction of greens, a dew point of the gas contained in the vessel in the region of the mold below the temperature of said mold, which can be regulated to any value between 0° C. and −100° C. inclusive, for example −40° C., −50° C., −60° C. and so on, can easily be maintained during an 8 hour working shift.

For larger greens, the dimensions of the outlet aperture require the introduction, by means of the distributor, of too high a rate of the dry gas stream. This stream has the disadvantage of warming the two parts of the mold and of thereby increasing the energy consumption for the production of cooling. In order to limit this warming, the external walls of molds can be covered with an insulating layer, but this is insufficient as during the few seconds of opening, there is direct contact. Moreover, this dry air stream also warms the greens, which is also undesirable. Different devices described below enable greens to be received and transferred to the outside under optimum conditions, particularly without the introduction of humidity into the vessel.

A moveable receiving tray is preferably used for receiving the green ejected from the mold, comprising an elastically deformable receiving surface able to receive the green without a violent shock.

Particularly preferably, a dry gas advantageously having the same characteristics as the gas introduced into the vessel is injected below the deformable receiving surface in a manner such as to inflate it, and this receiving surface is provided with sufficient permeability for the dry gas current which passes through this surface from bottom to top to protect it during transfer of said receiving tray towards an outlet aperture.

Advantageously a flexible material is used for producing this deformable and permeable receiving surface such as a woven or non-woven fabric in a natural or artificial fiber or a mixture of natural and artificial fibers.

The use of a surface produced from a perforated elastomer with holes of a small diameter or also a plastics material perforated in this manner can also be envisaged.

According to a first embodiment, the transfer of the receiving tray loaded with a green is done by integrating this receiving tray with a moveable slide valve able to slide through an outlet aperture having the same cross-section as the slide valve, provided with a lip seal or a brush seal able to limit the loss of gas to the exterior of the vessel. The receiving tray is located between two closed and gas-tight parallelepiped compartments with the same cross-section as the outlet aperture of the vessel. When the receiving tray is in position for receiving an ejected green, one of the two compartments is in a position blocking the outlet aperture; by exerting traction on the slide valve, the receiving tray leaves the vessel and the outlet aperture is then blocked by the second compartment. It should be noted that the outlet aperture is partially open for the passage of the receiving tray either in one direction or the other. Partial opening of this type risks being insufficient to ensure an even gas current through the vessel and it could be advantageous to provide a supplementary aperture in the wall of the vessel, controlled by a valve in order to regulate the flow of the gas current, most particularly in the area of the mold and its guiding members. The displacement of the slide valve can be controlled by a jack or also by a belt which can be indexed or non-indexed and is driven by an electric motor. The receiving tray is preferably permanently supplied by a flexible supply tube for introducing dry gas, which travels with the slide valve when it is displaced.

Another way of transferring the receiving tray consists of connecting it to an articulated arm on a bearing surface which is integral with a sliding frame. A vertical jack arranged below the tray and bearing upon the frame allows the tray to be raised for decreasing the length of the fall of the green ejected from the mold. After returning to the bottom position in order to pass below a rod, a jack or an endless belt displaces the frame and brings it to below an outlet aperture closed by a cover and the jack allows the tray to be applied against the annular contour of the aperture. The tray is advantageously provided on its edges with an elastomer gasket which joins against the wall of the vessel. As in the preceding case, a flexible pipe supplies the tray with dry gas so as to maintain a current of dry gas beneath the deformable and permeable receiving surface, this current avoiding or limiting penetration of humidity from the external air. The outlet aperture cover itself is provided with a gasket for avoiding uncontrolled leaks of the gas contained in the vessel which the receiving tray is returned to its initial position.

According to another embodiment of the device for receiving and transferring the green, the receiving tray can be placed above a frame to which it is connected by a lifting means comprising, for example, a gas-tight elastomer bellows. This bellows is folded when there is no internal pressure, for example during the operation of return springs, but can expand with the introduction of a compressed gas circulating in a flexible pipe connected to an external supply. In this way the receiving tray is raised to decrease the length of the fall of the green ejected from the mold, then by causing the pressure to drop, the tray goes back down, settles on the frame and can be transferred by the action of a jack or an endless belt to the proximity of an aperture made in the wall of the vessel and closed, as in the preceding case, by a gas-tight cover.

By once again raising the pressure in the bellows, the edge of the plate provided with an elastomer gasket is pressed in a sealing manner to the wall of the vessel around the removal orifice. With subsequent removal of the cover, the green is removed.

During at least this period of opening at least one current of dry gas is retained across the deformable and permeable receiving surface to prevent penetration of humidity into the vessel. This current of dry gas comes from a flexible pipe which supplies the receiving tray independently of the bellows supply. After having deflated again, the bellows is returned to its initial position.

In the case of this embodiment, as with the preceding one, it may be desirable to provide the wall of the vessel with an aperture controlled by a valve in order to create a leakage of gas at a controlled rate in order to regulate the rate of the gas current which circulates in the area of the mold.

It is indeed an even flow of dry gas at a relatively slow rate with a slight pressurization which enables a dew point lower than the temperature of the mold and its guiding members in the area in which these are located to be guaranteed.

According to a last embodiment for the transfer of a receiving tray provided with a deformable and permeable receiving surface as well as, advantageously, a dry gas supply by means of a flexible pipe, for circulation of this gas from the bottom to the top through this receiving surface, the receiving tray is housed in a guide channel which passes through the vessel in a gas-tight manner and the end of which is also closed in a gas-tight manner. An endless belt inside the vessel allows the receiving tray, after receiving the green, to be pushed to the bottom of the channel. An elastomer membrane housed at the end of the channel below the receiving tray allows the receiving tray to be raised into a position for taking the green and for placing its edges in a gas-tight manner, by virtue of a seal, against a shoulder of the channel around an upper aperture thereof. A fixed cover provided with a gasket which blocks this aperture allows the green to be removed. After blocking of the aperture a flexible pipe connected to the cover and to a pump can allow the air contained in the receiving tray below the receiving surface to be extracted at the same time as dry air is injected underneath. In this manner very efficient sweeping is effected which prevents any penetration of humidity into the vessel.

An aperture provided in the lower part of the vessel is controlled by means of a valve as in the preceding example.

The device according to invention can also be adapted for a case where the closure and opening of the mold is done by a molding machine with a vertical axis, the closure of the two parts of the mold being effected according to a horizontal plane. A frame which slides horizontally is rotated, for example on slides, said frame being provided with an arm at the end of which the receiving tray is placed. In the receiving position, the receiving tray is a little above the fixed part of the mold and in the axis of the device in such a way as to receive the green removed from the moveable part of the mold. A means for translating the frame, such as a jack or indexed knuckle joint displaces the frame and the plate laterally and introduces them into a lateral extension of the vessel. The receiving tray having received the green is thus guided under the outlet aperture provided with a gas-tight shutter. A jack bearing upon the frame raises the receiving tray and puts it in contact in a gas-tight manner with the wall of the vessel around the aperture. It is now possible to remove the green. The receiving tray is supplied with dry gas by a flexible pipe. The cover is also connected by a flexible pipe to the same dry gas supply, which allows purging to be effected during closure.

As in the preceding embodiments of the device according to the invention, an aperture controlled by a valve could be provided which allows an even current of gas to be produced around the mold and its guiding members.

Numerous variations can be made to the process and/or device which do not go beyond the scope of the invention.

The examples and the drawings hereinafter describe, in a non-limiting manner, embodiments of the process and of the device according to the invention.

DESCRIPTION OF THE PREFERRED EMBODIMENTS

Example 1

Figure 1:
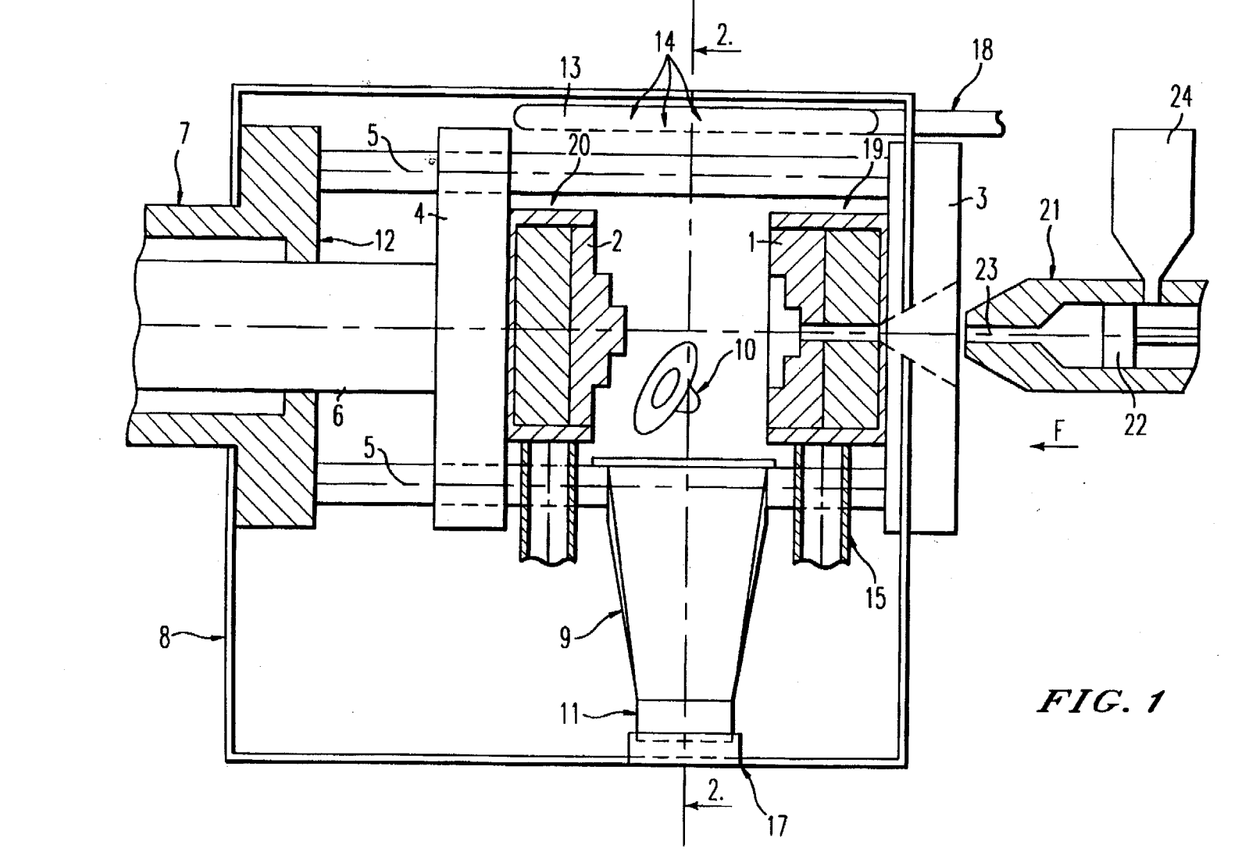
FIG. 1 is a schematic view in longitudinal section of a device for injection molding of greens from a slurry, comprising an outlet chute with a jack with a horizontal axis of closure, and sweeping by a dry gas current according to the invention.
Figure 2:
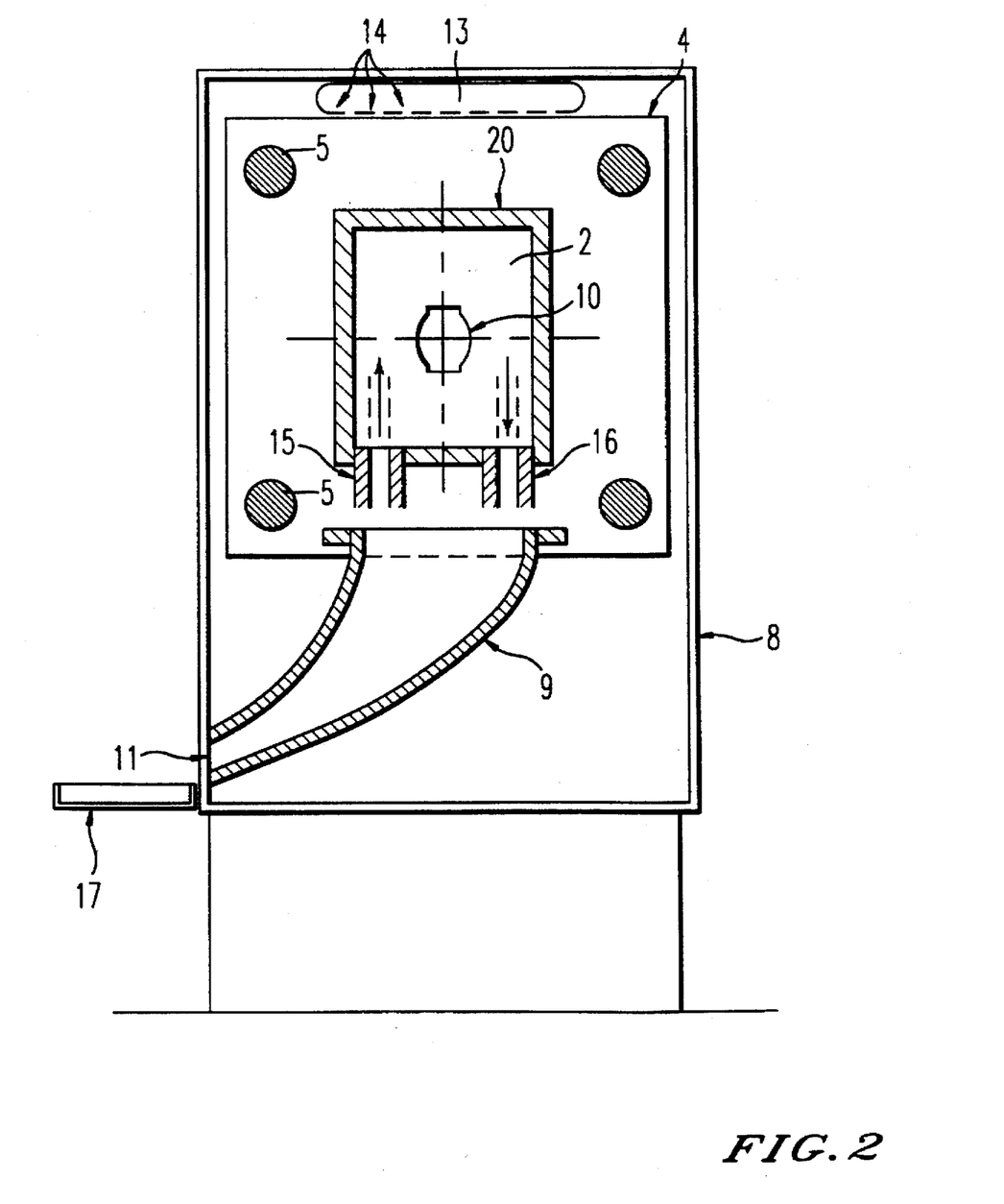
FIG. 2 is a cross-section of FIG. 1 taken along line 2—2.

FIGS. 1 and 2 show a first embodiment of the process according to the invention and of the corresponding device.

FIG. 1 shows an injection molding device for a slurry in a mold cooled to a temperature below 0° C., the green obtained having to be subsequently vacuum dried and then sintered at a suitable temperature.

The slurry used consists of a divided solid phase comprising at least one non-organic powder in suspension in a liquid phase. This liquid phase can be aqueous or organic and comprise different additives such as cryoprotective agents, dispersants, agents for adjusting the viscosity of the slurry or its homogeneity, agents for reinforcing the mechanical resistance of greens and so on.

Examples of slurry composition, which are not limiting, are given in patents WO 88/07902 and WO 88/07903, cited above. These examples relate to slurries based on metallic or ceramic powders or of mixtures thereof in suspension in aqueous or non-aqueous solutions generally containing various additives.

According to the process according to the invention, it is proposed to maintain a gaseous atmosphere around the components of the mold in which the greens are produced by solidification of the slurry, the dew point of which is no higher, and is preferably lower, than the temperature of the components of said mold.

In order to achieve this, only the two parts 1, 2 of the mold, the first being supported by a fixed plate 3 and the second by a moveable plate 4, as well as the rods 5 and the piston 6 of the jack 7 are housed inside a vessel 8 in which it is proposed that a gaseous atmosphere is produced having the characteristic of a low dew point, which has just been specified.

A removal chute 9, also housed in the inside of the vessel beneath the mold allows each molded green 10 to be received after opening of the mold and ejection of said green 10. The green is transferred by gravity inside the chute in the direction of the outlet aperture 11, the section of which is determined so as to allow the passage of said green which is subsequently received in a receptacle 17.

As FIGS. 1 and 2 show schematically, the slurry is injected by a device 21 which is located outside the vessel 8. The walls thereof are advantageously produced in a gas-tight, transparent, plastics material which has sufficient mechanical strength, such as, for example, a methyl polymetacrylate or a polycarbonate.

It can be seen that one of the side of the vessel 8 is integral with the fixed plate 3, the opposite side being integral with the annular rim 12 of the jack 7, the piston of which drives the moveable part 2 of the mold.

According to the invention, a fluid gas distributor 13 is placed in the proximity of the mold 1, 2, that is to say in the present instance above the mold against the upper wall of the vessel. This distributor is a tube arranged as a trapezoid, of which only one of the four sides is shown. It is perforated with holes such as 14, distributed along its length and oriented in a manner such as to direct the gas stream towards the mold. The supply of dry gas for the distributor 13 is effected externally by the tube 18. The outlet aperture 11 for the gas contained in the vessel is located beyond the mold 1, 2, with respect to the general direction of the current of gas created by the distributor and remains permanently open.

FIG. 2 which is a view according to the plane section 2—2 in FIG. 1 shows the apertures for entry 15 and discharge 16 of the coolant fluid which lowers the temperature of the fixed part 2 of the mold to the desired level. The part 1 of the mold is cooled in the same manner. The flexible pipes 15, 16 are thermally insulated and are connected in a manner not shown to a refrigerating generator which is not shown, arranged outside the vessel. The temperature of the parts 1, 2 of the mold is thus lowered to about −40° C., −50° C., −60° C. to −80° C. For certain applications temperatures within the range of 0° to −60° C. can be sufficient, but on the other hand the use of temperatures in the range of −60° to −100° C. offers significant advantages, in particular for slurries using aqueous dispersants from the point of view of the quality of the greens and thus also of the sintered parts which result therefrom, as well for the level of productivity of the molding machine.

As shown in FIG. 2, The chute 9 is located below the mold 1, 2 in order to be on the trajectory of the green 10 when it is ejected. This is done in a known manner which is not shown, by the moveable part 2 of the mold by means of metal rods which are not shown which penetrate the back of the part 2 of the mold and exert a pushing action on the green after opening of the mold. After ejection, the green 10 is guided by the chute 9, passes through the aperture 11 and falls into the receptacle 17. The discharge rate of dry gas, such as air, nitrogen or another gas, is mainly chosen as a function of the section of the aperture 11 which itself is a function of the dimensions of the greens which have to pass through it.

In the case, for example, of a rectangular aperture measuring 3 cm high and 5 cm wide, experience has shown that a rate of approximately 40 m³ per hour of dry air with a dew point lower than −60° C. enables avoidance of any condensation at the level of a mold 1, 2 cooled to approximately −50° C. during mass production of greens at a rate of approximately 2 injections per minute. The absorbtion of heat by the parts 1, 2 of the mold is reduced by covering them, for example, laterally with an insulating layer, for example, of expanded plastics 19, 20.

The injector 21 is moveable and it bears upon the fixed plate 3 according to the arrow F during injection while the piston 22, actuated by known means which are not shown, injects the slurry. After injection, the injector again withdraws to avoid cooling of its end to below 0° C. These cyclical displacements are controlled in a known manner such as, for example, by a jack, and are not shown.

The arrangement adopted allows free access to the feed hopper 24 and to the injection assembly 21 during use, which is often necessary, particularly during cleaning.

In this way greens are mass produced for stainless steel watch cases from a slurry containing a stainless steel powder with a grain size of less than 20 micrometers, placard in suspension in an aqueous or non-aqueous base. After drying by vacuum sublimation, then sintering, parts are obtained the density of which reaches 99.5% of the theoretical density of forged metal.

The process and the device are also suitable for the production of greens based on metallic or ceramic powders or else a mixture of ceramic powder and metallic powder.

The process and the device according to the invention are suitable for production of greens with a very complex shape, which cold be damaged during the fall in a chute or for which it wold be necessary to have outlet apertures with a larger section, which wold necessitate too great an increase in the rate of discharge of dry gas. The circulation of the gas in the inside of the vessel causes warming of the mold despite the cooling of the walls.

The following examples relate to different devices which are relevant to another embodiment which allows these problems to be resolved.

Example 2

Figure 3:
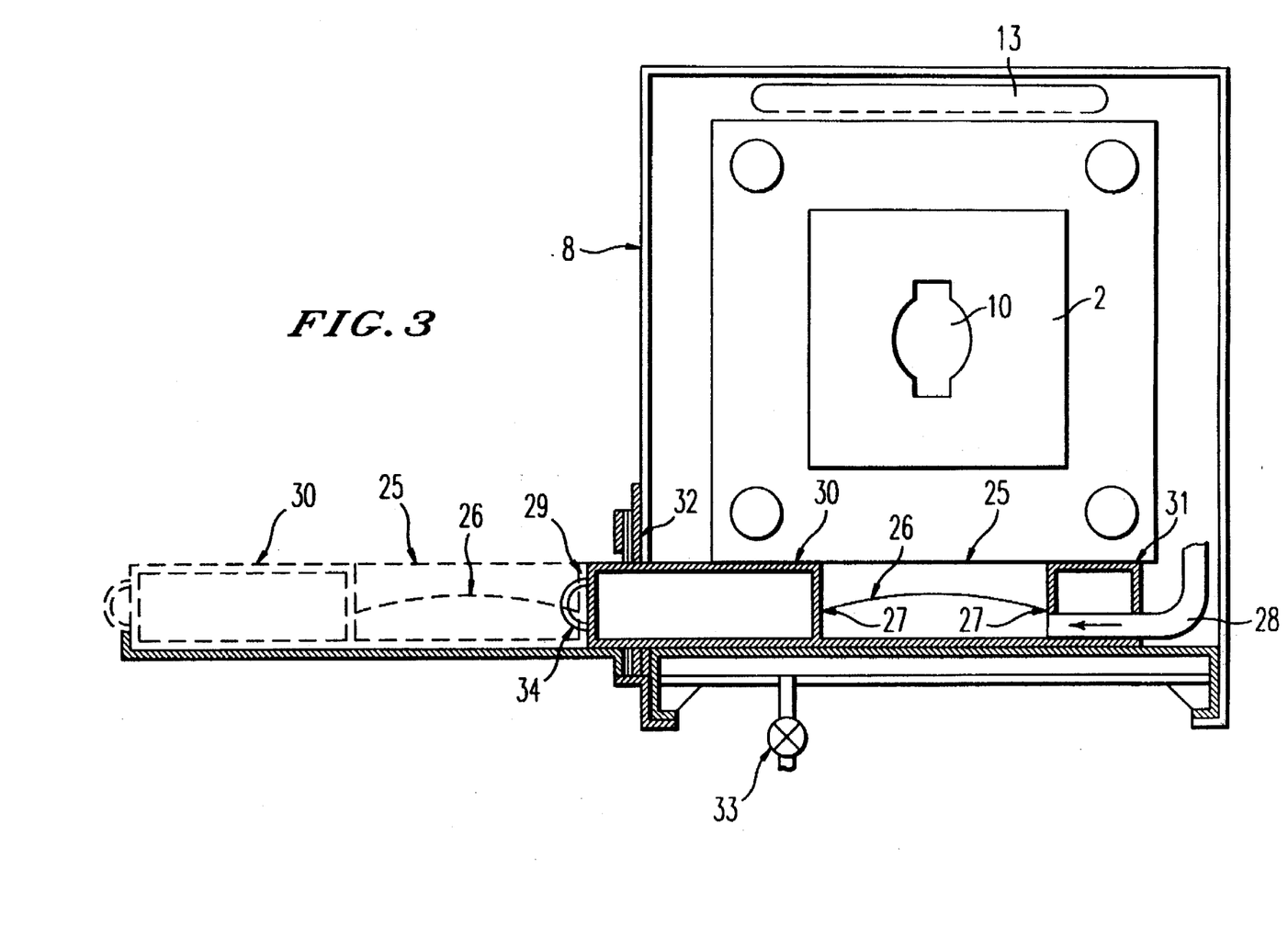
FIG. 3 is a schematic view in cross-section of a molding device with a horizontal axis according to the invention, provided with a slide valve for transfer of a receiving tray according to the invention.

FIG. 3 relates to an embodiment of the process and of the device according to the invention in which the greens are no longer removed by passing through a permanently open chute.

In order to do this, as shown in FIG. 3 which is, like FIG. 2, a view along a perpendicular plane of the axis of closure of a mold, of which only the moveable component 2 in its opening position is shown, a receiving tray 25 is used. This receiving tray consists of a receiving surface 26 composed of a deformable flexible material such as a woven or non-woven fabric in a natural, synthetic or mixed fiber, or else a plastics material or an elastomer having fine perforations, fixed to a frame 27 by its edges. This fabric is permeable in a manner such as to allow the passage of a current of gas with a dew point lower than the temperature of the mold, which is introduced into the inside of the receiving element from underneath it so that it diffuses through it from bottom to top. This gas current advantageously has the same composition as that which supplies the distributor 13, but with a discharge rate preferably much lower.

After the green 10 has been ejected and received on the deformable receiving surface 26 of the plate 25, the green is transferred outside the vessel by means of a slide valve 29 with a rectangular cross-section. This slide valve is able to slide through the vessel 8 by virtue of an aperture provided with a seal 32 and by virtue of adapted sliding members which are not shown. The seal 32 can be a lip seal or a semi-gas-tight brush seal, such as that shown, analogous to those which furnish revolving doors or else any other type of seal adapted for this type of sliding contact.

The receiving tray 25 is placed between two closed and gas-tight parallelepiped compartments with the same cross-section as the receiving tray 25 which acts as a moveable shutter.

As shown in the left-hand part of FIG. 3, shown in dashed lines, it is possible by pulling on the handle 34 to take the receiving tray out of the vessel completely, as far as a stop position, the second compartment 31 now acting as a shutter at the level of the aperture provided with the seal 32. The green can now be removed and then the slide valve returned to its initial position.

The pipe 28 which introduces the dry gas into the receiving tray 25 underneath the receiving surface 26 passes through the compartment 31. This flexible pipe has the length required, which is not shown, for travelling with the slide valve during its alternating displacement while remaining connected to the dry gas supply located outside the vessel and which is not shown.

The quantity of humidity brought into the vessel by the slide valve can be limited by increasing the rate of discharge of dry gas through the fabric during the alternating displacements of the slide valve 29.

Preferably the maintenance of an even current of dry gas in the vessel is facilitated by virtue of the discharge rate of the distributor 13 and by virtue of the establishment of a permanent flow of the gas contained in the vessel towards the outside through an aperture provided in the wall of said vessel beyond the area of the mold 2 with respect to the distributor. The discharge rate through this aperture is controlled by a valve 33. By precisely regulating the rates of discharge of dry gas through the distributor 13 and through the receiving surface 26 as well as the discharge rate of gas expelled from the vessel through the valve 33, a set level of pressurization can be maintained in the vessel. This pressurization allows in particular the penetration of humidity with each coming and going of the receiving tray 25 to be limited. The movements of the slide valve 29 can be controlled by well known mechanical means such as a dual-operation jack, an indexed endless belt driven by an electric motor or any other device. Electronic means which are well known can allow the discharge rates of gas through the distributor 13, through the receiving surface 26 and through the valve 33 to be controlled, and to be adjusted in order to maintain the pressurization in the vessel at a set level.

Example 3

Figure 4:
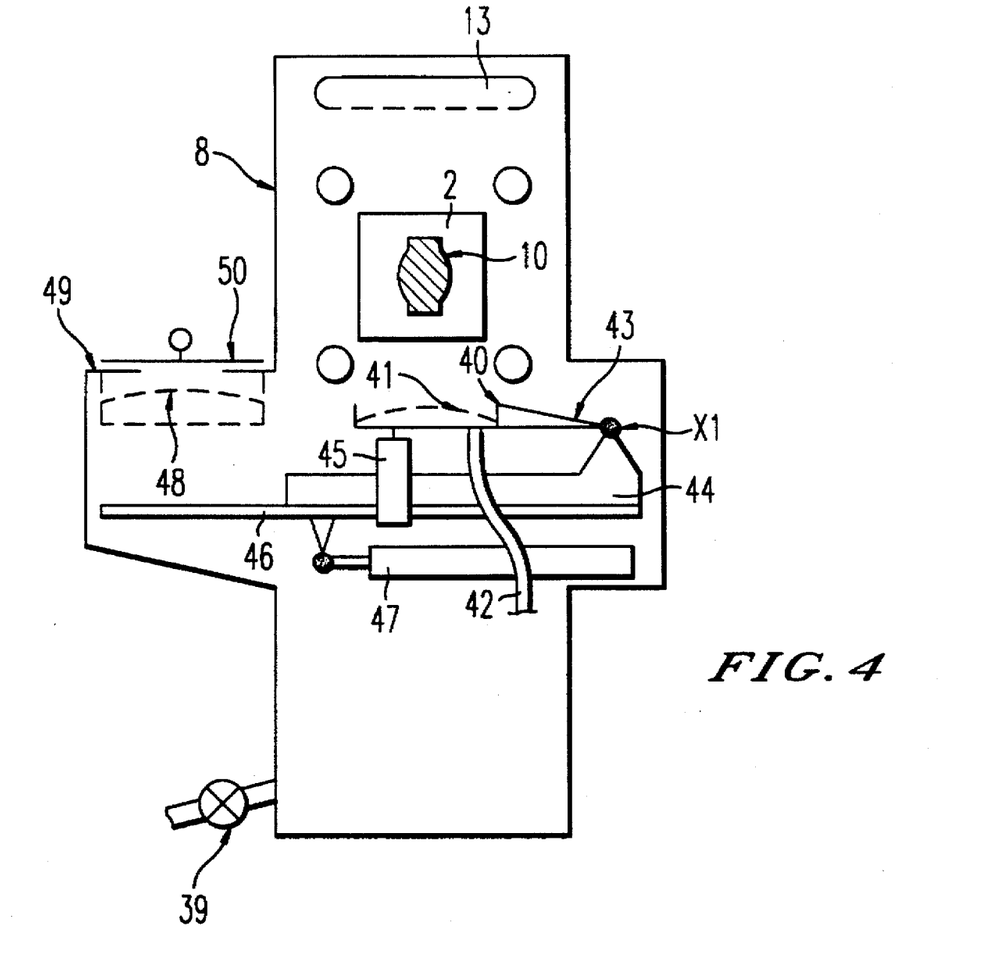
FIG. 4 is a schematic view in cross-section of a molding device with a horizontal axis according to the invention, provided with a transfer frame according to the invention.

FIG. 4 shows a different method for receiving and transferring the green 10 ejected from the moveable part of a mold schematically shown by the line 2, the general arrangement of the molding assembly being analogous to that shown in FIG. 3. The receiving tray 40 comprises a permeable receiving surface 41 passed through from bottom to top by a current of dry gas from a flexible pipe 42 supplied from outside by a controllable supply means which is not shown which preferably also supplies the distributor 13 placed in the proximity of the mold 2.

The receiving tray 40 is articulated by means of arms such as 43 (see FIG. 5), about an axis X1—X1, perpendicular to the plane shown in FIG. 4, on bearing surfaces connected to the frame 44. A compressed air jack 45 connected to the frame 44 supports the receiving tray 40 and helps to elastically absorb the shock caused by the impact of the green 10 ejected from the mold 2 onto the receiving surface 41. The frame 44 being mounted on horizontal sliding members 46 is displaced thereupon due to the action of a compressed air jack 47 to a transfer position, for which the receiving tray is located directly beneath an outlet aperture provided in the wall 8 of the vessel. Control means which are not shown allow the receiving tray 40 to be raised by means of the jack 45 to press it against the wall 49 of the vessel 8 in the area surrounding the aperture 48. This pressing is in a gas-tight manner by virtue of a gasket which is not shown with which the edge of the receiving tray 40 is provided. The cover 50 is then opened and the green transferred outside the vessel. The cover 50 is then reclosed in a gas-tight manner by virtue of gaskets which are not shown and the receiving tray 40 is returned to its initial position. In order to avoid penetration of humidity in to the vessel, the rate of discharge of dry air from the pipe 42 through the receiving surface 41 is increased.

As in the case of the preceding example, the wall of the vessel is preferably provided with an aperture with a discharge rate controllable by means of a valve 39 in order to control an even flow of the gas stream introduced by the distributor 13 and to keep the pressurization prevailing inside the vessel 8 within set limits. It should be noted that the receiving surface 41 of the tray 40 can be replaced by any shock-absorbing means suitable for damping the impact of the green on the tray.

Example 4

Figure 5:
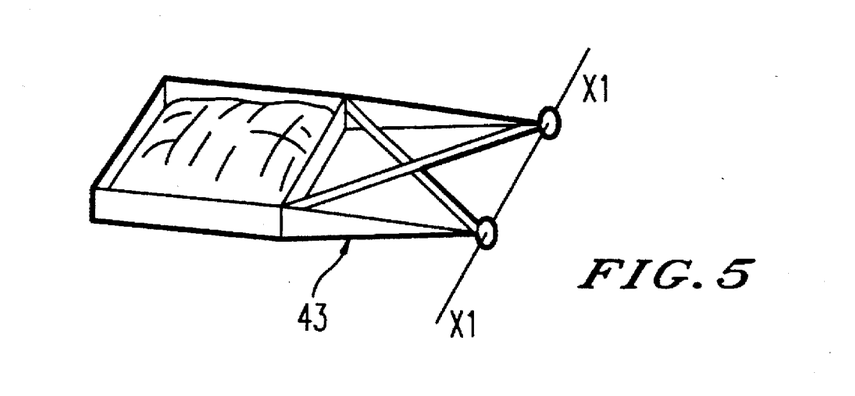
FIG. 5 is a detailed view of a receiving tray with arms of FIG. 4.

This example, like that shown in FIGS. 3 to 5, relates to the transfer of a green ejected from the moveable part of a mold with a horizontal axis of closure. The general arrangement of the molding assembly is analogous to that shown in FIG. 3.

Figures 6, 7, 8:
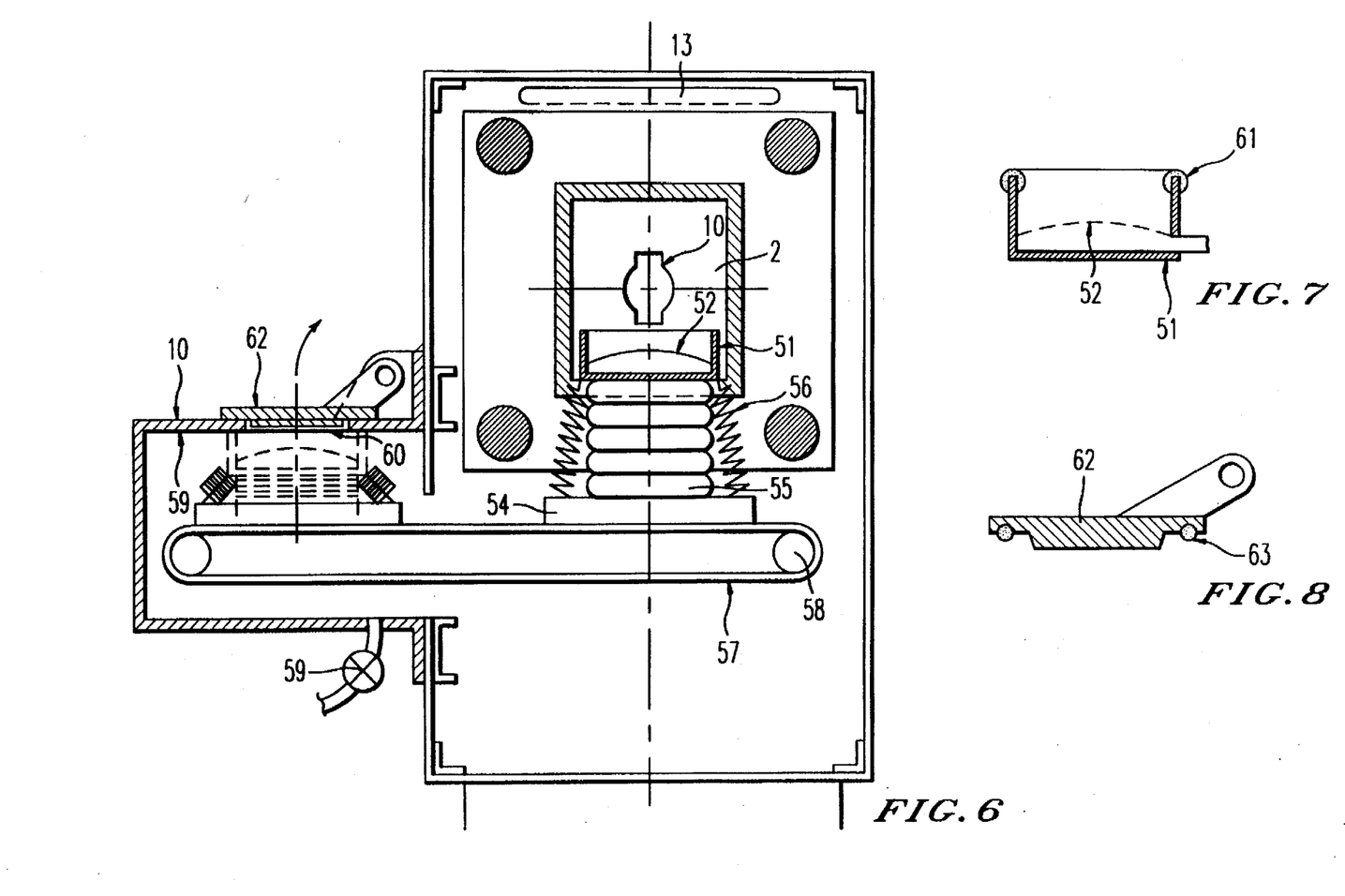
FIG. 6 is a schematic view in cross-section of a molding device with a horizontal axis according to the invention, provided with a transfer frame with an inflatable bellows.
FIGS. 7 and 8 show details of the device of FIG. 6.

According the present FIG. 6 and also the detail shown in FIG. 7, a receiving tray 51 is used which comprises a shock absorbtion means for receiving greens, like those shown in FIGS. 3 and 4 composed of a permeable receiving surface 52. Arrival of dry air into aperture 53 by means of a flexible pipe which is not shown, and the connection thereof to the outside of the vessel which is also not shown, allows a dry gas stream to be produced from the bottom to the top through the permeable receiving surface 52. The tray is connected to a frame 54 by a bellows 55 made of an elastomer able to expand vertically in order to reduce the length of the fall of the green 10 when it is ejected.

The gas-tight space inside the bellows 55 is connected by a flexible pipe which is not shown, to a supply of pressurized gas outside the vessel or, by virtue of a 3-way valve which is not shown, is placed in contact with the air outside the vessel. Return springs 56 effect the lowering of the receiving tray once the internal pressure of the bellows is returned to atmospheric pressure. An endless belt 57 driven by an electric motor which is not shown, which actuates the roller 58, allows the receiving tray 51 to be transferred to the position located beneath the outlet aperture 60.

By renewed pressurization of the bellows 55 the edge of the receiving tray 51, which is provided with a gasket 61, is applied in a gas-tight manner against the wall 59 of the vessel in the area which surrounds the aperture 60. The cover 62, the gasket 63 of which (see FIG. 8) ensures sealing in the closed position, can now be opened. The green is now transferred to the outside and the cover is reclosed. It is possible to increase the discharge rate of the dry gas in the receiving tray 51 through the aperture 53 when the cover 62 is open to avoid penetration of humidity into the upper part of said tray. After closure of the cover 62 and reduction of the pressure in the bellows 55, the frame can be returned to its initial position pending the next operating cycle. As in the case of the examples shown in FIGS. 3 and 4, it is necessary to establish inside the vessel an even stream of dry gas with a dew point lower than the temperature of the mold in the region thereof. The entrance of dry gas takes place through the distributor 13 and the even discharge of gas from the vessel takes place beyond the area of the mold with respect to the distributor. This discharge is controlled by the valve 59.

Example 5

The example which follows relates to a molding machine with a vertical axis of closure, injection of slurry being carried out from the bottom to the top following the axis of closure.

Figure 9:
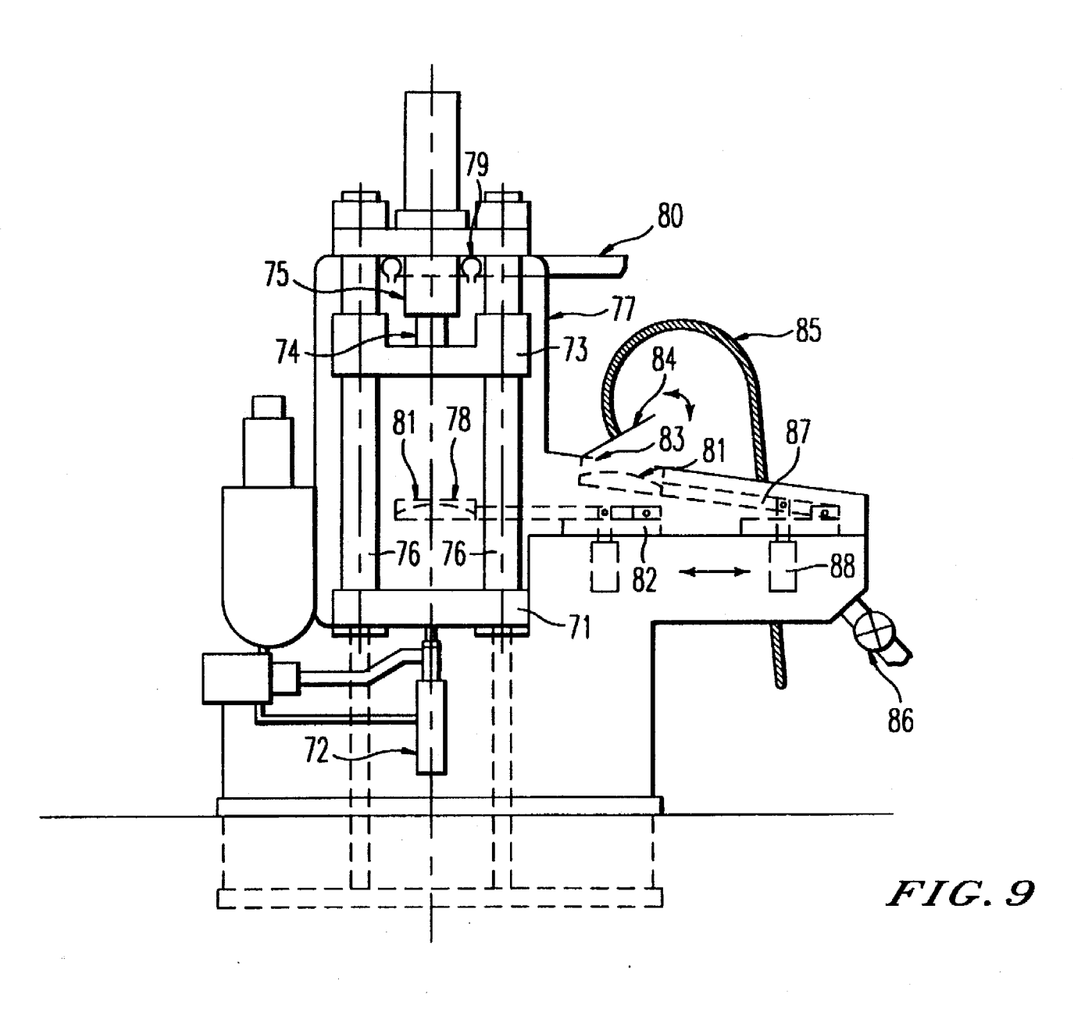
FIG. 9 is a schematic view in cross-section of a molding device with a vertical axis according to the invention.

As shown in FIG. 9, which is purely schematic, the two parts of the mold which are not shown in detail are made integral, one with a fixed horizontal plate 71 through which the slurry is injected by the injector 72 and the other part with the moveable plate 73 actuated by the piston 74 of a jack 75. Vertical sliding valves 76 form the connection between the fixed plate 71 and the body of the jack 75. A vessel 77 contains the fixed plate 71 and the moveable plate 73 as well as the sliding valves 76 and the piston 74. The vessel 77 is delimited at the lower part by the level of the fixed plate 71 and also contains the mechanism for transferring the receiving tray 78. A distributor 79 for dry gas, nitrogen or other gas with a dew point lower than the temperature of the mold is housed at the top end of the vessel, and is in the form of an annular tube perforated by holes oriented towards the bottom of its circumference and surrounding the body of the jack 75. The distributor is supplied in a known manner by a pipe 80 connected to a dry gas supply which is not shown. The receiving tray 78 which is provided with a flexible, permeable receiving surface 81 for damping the impact of the greens, is provided with a dry gas inlet by means of a flexible pipe which is not shown. The tray is supported by a carriage 82 able to be displaced on sliding members due to the action of a suitable means such as a jack or an endless belt driven by an electric motor, or any other suitable means. The carriage 82 allows the receiving tray 78 to be introduced between the two mold carrying plates and to receive the green after ejection from the moveable part of the mold. The carriage then displaces the receiving tray to the right to the position for transfer of the green through the aperture 83 which comprises a cover 84. An oscillating arm 87 connected to the carriage 82 and the receiving tray 78 allows the edge of the receiving tray to be applied by means of the jack 88 to the wall of the vessel in the area surrounding the aperture. Sealing means such as those shown in FIGS. 7 and 8 enable gas-tight connection between the edges of the receiving tray 78 and the edge of the vessel surrounding the aperture 83. A dry gas supply connected to the cover 84 by a pipe 85 allows sweeping of the dry gas above the receiving tray 78 during closure of the cover 84, after removal of the green, in order to reduce the penetration of humidity. An aperture provided in the wall of the vessel in the proximity of the carriage 82 and provided with a valve 86 allows the establishment inside the vessel of an even current of dry gas from the distributor 79 in order to maintain the dew point at a lower temperature than that in the proximity of the mold. The control of the pressurization inside the vessel and that of the discharge rate of the dry gas can be automated. In the same way, each operating cycle can be automated.

Example 6

Figures 10, 11:
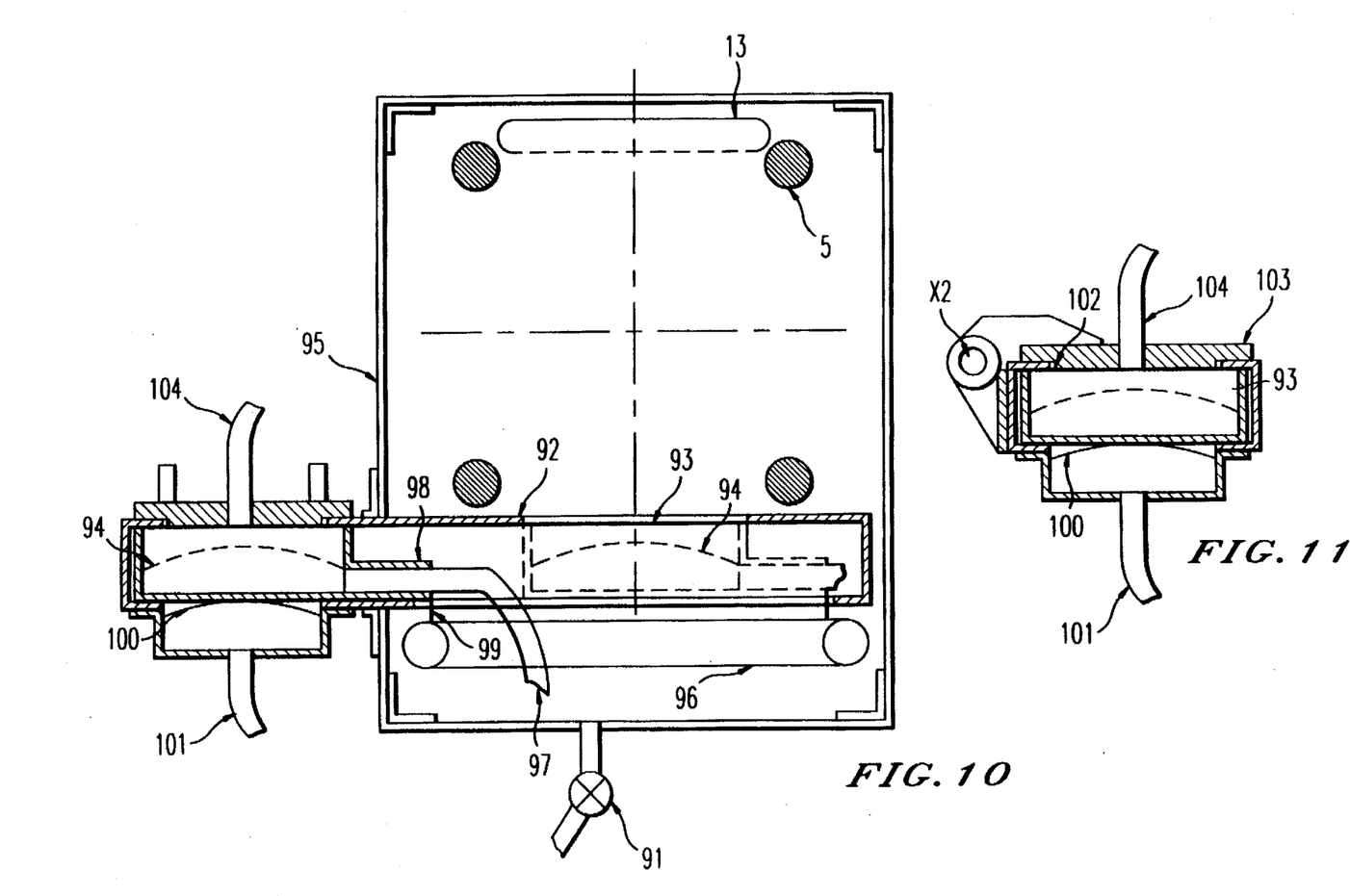
FIG. 10 is a schematic view in cross-section of a molding device with a horizontal axis according to the invention, provided with a transfer channel also according to the invention.
FIG. 11 shows a detail of the device of FIG. 10.

This example corresponds to FIGS. 10 and 11, and relates to a particular embodiment of the device according to the invention in which it has been sought to reduce the opportunities for the penetration of humidity into the vessel, as well as the consumption of dry gas to a minimum. It has been applied to a molding machine with a horizontal axis analogous to that shown in FIG. 3. As in the case of FIG. 3, FIG. 10 is a view of the moveable plate of a press with a horizontal axis, said plate sliding on rods such as rods 5. A distributor 13 introduces a set stream of dry air in the direction of the mold and an aperture provided with a valve 91 allows the gas current passing through the area of the mold to be regulated and to maintain the vessel 8 at a slight pressurization. A guide channel 92 with a rectangular cross-section is configured to allow internal sliding without excessive friction of a receiving tray 93 provided with a shook-absorbing means composed of the receiving surface 94 made of a flexible deformable permeable material, fixed to the lateral walls of the receiving tray. The channel 92 is fixed and passes through the wall 95 of the vessel by way of a gas-tight passage. The end of the channel outside the vessel is also closed in a gas-tight manner. Inside the vessel the channel comprises lateral guiding elements but does not cover the receiving tray 93 in the receiving position, the upper part of which is open to receive each green ejected from its mold. The lower part of the channel comprises at least one longitudinal opening, in the inside of which an endless belt 96 driven by an electric motor which is not shown is housed. Moreover a flexible pipe 97 supplies the lower part of the receiving tray with dry gas by means of a connecting sleeve 98. The belt 96 drives the receiving tray, by means of the dog 99 placed on the end of the sleeve 98, to the end of the channel 92 outside the vessel. An elastic membrane 100 located in a housing open only onto the bottom of the channel 92 is connected by a pipe 101 to a separate pressurized gas supply which is not shown. By inflating this membrane the edges of the receiving tray 93 provided with an elastomer gasket, such as the gasket shown in FIG. 7, are flattened against the top edge of the channel in the area surrounding the aperture 102 closed by the shutter 103. Once the receiving tray is pressed in this manner against the aperture 102, the shutter 103 articulated about an axis X2 is opened and the green initially received inside the vessel is removed. The cover can then be reclosed while carrying out sweeping by injection of a dry gas by means of a flexible pipe 104 connected to a dry gas supply, which is not shown, which can be the same as that supplying the distributor 13. It is also possible to create a depression in the upper compartment of the receiving tray 93, connecting the pipe 104 to a pump. Now the introduction of dry gas underneath the receiving surface 94 can be combined with the depression created above in order to eliminate any trace of humidity. The membrane 100 can now be deflated and the receiving tray 93 returned to the receiving position by means of the endless belt.

In order to improve the gas-tightness of the shutter 103, closure thereof by means of a jack with a force set to enable an o-ring seal to be flattened with the required force can be considered. The same dual-operation jack wold be used for opening and closing this shutter.

As in the case of the preceding examples, automatic control means can be used for controlling the pressure inside the vessel and for regulating the discharge rates of the distributor 13 of the pipe 97 which supplies the receiving tray 93 and the discharge rate of the aperture though the valve 91 which enables a set discharge rate to be maintained around the area of the mold and maintenance of a set pressurization inside the vessel. At the same time, it is possible to automate the cycle of operations of receiving the green, of transferring it to the outlet point as well as its removal from the receiving tray and its passage through the aperture 102 controlled by the shutter 103.

We claim:

1. An apparatus for producing a green obtained by injection and solidification in a mold, brought to a temperature lower than 0° C., of a slurry containing at least one of a metallic and non-metallic powder in suspension in a liquid, which comprises:

a device for injecting said slurry into said mold;

a gas tight vessel within which the mold is housed, the vessel having an outlet aperture in a wall thereof for passage of the green therethrough, the outlet aperture being one of continuously and discontinuously opened;

an opening and closing mechanism housed in the vessel, said mechanism ensuring opening and closing of the mold and ejection of the green from the mold; and a gas supply distributor communicating with the interior of the vessel and supplying one of a continuous and discontinuous current of dry gas to the interior of a vessel, said dry gas having a dew point which is not greater than the temperature of the mold.

2. Apparatus according to claim 1, which comprises a receiving tray receiving the green upon being ejected from the mold, wherein said gas supply distributor emits said current of dry gas into an interior portion of the vessel, in proximity with the mold, said current of gas being oriented in a direction towards the mold.

3. Apparatus according to claim 2, which comprises: a shock-absorbing member supporting the receiving tray and diminishing an impact of the green on the receiving tray after the green is ejected from the mold.

4. Apparatus according to claim 2, the receiving tray having an inflatable, flexible and permeable surface.

5. Apparatus according to claim 1, wherein said gas supply distributor emits said current of dry gas in a direction towards the mold.

6. Apparatus according to claim 1, which comprises a mechanism keeping the outlet aperture permanently open wherein said aperture is utilized in transferring the green to the outside of the vessel.

7. Apparatus according to claim 5, wherein the gas supply distributor includes a distribution mechanism situated in proximity with the mold and which is arranged in such a manner as to distribute the current of dry gas and to orientate the current or dry gas in a direction towards walls of the mold.

8. Apparatus according to claim 6, which comprises a device transferring the green outside the vessel, a chute housed in the interior of the vessel, the chute and the aperture being positioned in such a manner as to receive, on an upper part of the chute, the green ejected from the mold, the chute guiding the green by gravity to the aperture, through which the green passes.

9. Apparatus according to claim 2, which comprises a mechanism lifting the receiving tray and reducing a vertical distance between the receiving tray and an area of ejecting of the green in order to reduce an impact of the green on the receiving tray.

10. Apparatus according to claim 2 wherein the vessel includes a sliding shutter, the aperture is opened in a discontinuous manner and wherein transferring of the green to the outside of the vessel includes moving the receiving tray outside the vessel permitting removal of said green and returning of the receiving tray to an initial position thereof, the sliding shutter allowing a reduction in gas leakage to the outside of the vessel whenever the receiving tray is inside the vessel for receiving the green and outside the vessel for removing the green.

11. Apparatus according to claim 2, wherein the outlet aperture is provided with a cover, the aperture is opened in a discontinuous manner and a device conducts the green to the outside of the vessel, said conducting device comprising a transferring mechanism transferring the receiving tray to a position located below the outlet aperture of a portion of the vessel contacting the top edge of the receiving tray against the area surrounding the aperture to remove the green after removal of the cover and subsequently closing the cover and returning the receiving tray to an initial position thereof.

12. Apparatus according to claim 11, which comprises a device circulating an additional current of dry gas from a bottom portion of the receiving tray to a top portion of the receiving tray around the green contained in the receiving tray, at least during a period wherein said aperture is opened before the green is moved outside.

13. Apparatus according to claim 11, wherein the aperture cover which allows the green to be removed from the receiving tray comprises a pipe, said pipe conducting an additional current of dry gas which allows a surface of the receiving tray to be swept after removal of the green and before returning the receiving tray to an initial position thereof.

14. Apparatus according to claim 11, wherein the cover of the aperture allowing the green to be removed from the receiving tray comprises a suction pipe wherein after closing of the cover, said suction pipe suctions off the gas present in the receiving tray.

15. Apparatus according to claim 1 wherein the vessel includes, in addition to the outlet aperture, at least an additional aperture controlled by a first mechanism which regulates a discharge rate of the current of dry gas, said apparatus further comprising a second mechanism regulating the current of dry gas around the area of the mold and regulating pressure in the vessel so as to be maintained within set limits.

16. Apparatus according to claim 1, which comprises a first mechanism controlling the discharge rate of dry gas introduced in an emission area in the proximity of the mold, a second mechanism controlling the discharge rate of the current of dry gas introduced in a receiving tray for the green, and a third mechanism allowing measurement of the discharge rate of gas expelled from the vessel at the level of an additional aperture in order to automatically adjust the discharge rate of the additional aperture, and which comprises a fourth mechanism maintaining the pressure inside the vessel within set limits while ensuring an even current of gas in the area of the mold, taking into account gas discharges being produced at the time of removal of the green from the receiving tray in each operating cycle.

* * * * *